(12) United States Patent
Holbert et al.

(10) Patent No.: US 7,093,680 B2
(45) Date of Patent: *Aug. 22, 2006

(54) SUBSURFACE SIGNAL TRANSMITTING APPARATUS

(75) Inventors: Marvin L. Holbert, Cochrane (CA);
James W. Haslett, Calgary (CA);
Robert E. Smallwood, Calgary (CA);
Frederick N. Trofimenkoff, Calgary (CA)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/744,683

(22) Filed: Dec. 23, 2003

(65) Prior Publication Data

US 2004/0134652 A1  Jul. 15, 2004

Related U.S. Application Data

(60) Continuation of application No. 10/161,310, filed on Jun. 3, 2002, now Pat. No. 6,672,383, which is a division of application No. 09/777,090, filed on Feb. 5, 2001, now Pat. No. 6,405,795, which is a division of application No. 08/981,070, filed as application No. PCT/CA96/00407 on Jun. 11, 1996, now Pat. No. 6,209,632.

(30) Foreign Application Priority Data

Jun. 12, 1995 (CA) .................................. 2151525

(51) Int. Cl.
*E21B 17/00* (2006.01)

(52) U.S. Cl. ................... 175/320; 166/65.1; 340/854.4

(58) Field of Classification Search ................ 175/320; 166/65.1; 340/854.4, 854.5
See application file for complete search history.

(56) References Cited

U.S. PATENT DOCUMENTS

| 2,000,716 | A | * | 5/1935 | Polk | 174/47 |
|---|---|---|---|---|---|
| 2,096,279 | A | * | 10/1937 | Karcher | 174/47 |
| 2,151,525 | A | | 3/1939 | Pittman et al. | 173/273 |
| 2,364,957 | A | | 12/1944 | Douglas | |
| 2,388,141 | A | * | 10/1945 | Harrington | 175/50 |
| 2,650,067 | A | * | 8/1953 | Martin | 175/50 |
| 2,917,704 | A | | 12/1959 | Arps | |
| 2,940,787 | A | | 6/1960 | Goodner | |
| 2,982,354 | A | * | 5/1961 | Green | 166/60 |
| 3,432,186 | A | * | 3/1969 | Braun | 285/53 |
| 3,831,138 | A | | 8/1974 | Rammner | 340/18 |
| 3,900,827 | A | | 8/1975 | Lamel et al. | 340/18 |
| 3,905,010 | A | | 9/1975 | Fitzpatrick | 340/18 |
| 3,944,262 | A | * | 3/1976 | Stiner et al. | 285/53 |
| 4,015,234 | A | | 3/1977 | Krebs | 340/18 |
| 4,160,970 | A | | 7/1979 | Nicolson | 340/18 |
| 4,348,672 | A | * | 9/1982 | Givler | 340/854.8 |

(Continued)

FOREIGN PATENT DOCUMENTS

CA   676449   12/1963

(Continued)

*Primary Examiner*—Hoang Dang
(74) *Attorney, Agent, or Firm*—Patterson & Sheridan, L.L.P.

(57) ABSTRACT

An insulator for a subsurface signal transmitting apparatus. The insulator includes a housing, a mandrel axially disposed inside the housing, a first insulating material disposed between the housing and the mandrel, a first sleeve formed of a second insulating material disposed between the housing and a first tubular member and the first tubular member coupled to the mandrel.

8 Claims, 7 Drawing Sheets

U.S. PATENT DOCUMENTS

| | | | |
|---|---|---|---|
| 4,494,072 A | 1/1985 | Jeter et al. | 324/347 |
| 4,496,174 A * | 1/1985 | McDonald et al. | 285/53 |
| 4,578,675 A | 3/1986 | MacLeod | 340/855 |
| 4,589,187 A | 5/1986 | Stone et al. | |
| 4,625,173 A | 11/1986 | Wisler et al. | 324/351 |
| 4,674,773 A | 6/1987 | Stone et al. | |
| 4,691,203 A | 9/1987 | Rubin et al. | |
| 4,736,204 A | 4/1988 | Davison | 340/856 |
| 4,786,086 A | 11/1988 | Guthrie et al. | 285/49 |
| 4,790,570 A | 12/1988 | De Gruijter | 285/54 |
| 4,800,385 A | 1/1989 | Yamazaki | 340/854 |
| 4,861,074 A | 8/1989 | Eastlund et al. | 285/53 |
| 4,927,186 A * | 5/1990 | Zoboli | 285/54 |
| 4,980,682 A | 12/1990 | Klein et al. | |
| 5,130,706 A | 7/1992 | Van Steenwyk | 340/854.6 |
| 5,138,313 A | 8/1992 | Barrington | 34/854.6 |
| 5,163,714 A | 11/1992 | Issenmann | 285/54 |
| 5,184,692 A | 2/1993 | Moriarty | 175/50 |
| 5,251,708 A | 10/1993 | Perry et al. | 175/41 |
| 5,278,550 A | 1/1994 | Rhein-Knudsen et al. | |
| 5,303,773 A | 4/1994 | Czernichow et al. | 166/66 |
| 5,394,141 A | 2/1995 | Soulier | 340/854.4 |
| 5,396,232 A | 3/1995 | Mathieu et al. | 340/854.5 |
| 5,448,227 A | 9/1995 | Orban et al. | 340/854.4 |
| 5,725,061 A | 3/1998 | Van Steenwyk et al. | |
| 5,749,605 A | 5/1998 | Hampton, III et al. | |
| 5,924,499 A | 7/1999 | Birchak et al. | 175/40 |
| 6,050,353 A | 4/2000 | Logan et al. | 175/320 |
| 6,098,727 A | 8/2000 | Ringgenberg et al. | |
| 6,158,532 A | 12/2000 | Logan et al. | |
| 6,209,632 B1 | 4/2001 | Holbert et al. | 166/65.1 |
| 6,223,826 B1 | 5/2001 | Chau et al. | |
| 6,367,323 B1 | 4/2002 | Camwell et al. | |
| 6,405,795 B1 | 6/2002 | Holbert et al. | 166/66 |
| 6,439,324 B1 | 8/2002 | Ringgenberg et al. | |
| 6,572,152 B1 | 6/2003 | Dopf et al. | |
| 6,672,383 B1 | 1/2004 | Holbert et al. | |

FOREIGN PATENT DOCUMENTS

| | | |
|---|---|---|
| CA | 1217231 | 1/1987 |
| CA | 1277027 | 11/1990 |
| CA | 1323691 | 10/1993 |
| CA | 2151525 | 6/1995 |
| FR | 2174955 | 10/1973 |
| FR | 2618912 | 2/1989 |
| GB | 1359445 | 7/1974 |
| WO | 82/02754 | 8/1982 |
| WO | WO 96/41931 | 12/1996 |
| WO | WO 98/06924 | 2/1998 |
| WO | WO 00/13349 | 3/2000 |

* cited by examiner

SUBSURFACE SIGNAL TRANSMITTING APPARATUS

This is a continuation of application(s) Ser. No. 10/161,310, filed Jun. 3, 2002 now U.S. Pat. No. 6,672,383, which is a divisional of Ser. No. 09/777,090, filed on Feb. 5, 2001, which has issued as U.S. Pat. No. 6,405,795, which is a divisional of Ser. No. 08/981,070 filed on Dec. 10, 1997, which has issued as U.S. Pat. No. 6,209,632, which was filed in the U.S. under 35 U.S.C. Section 371 based on international application number PCT/CA96/00407, filed Jun. 11, 1996, which claims benefit of Canadian application Serial No. 2,151,525, filed on Jun. 12, 1995. All of the above applications are hereby incorporated by reference in their entireties.

TECHNICAL FIELD

This invention relates to a subsurface signal transmitting apparatus of the type for sensing certain conditions in a bore hole and then transferring them to a surface located receiver.

BACKGROUND ART

In the oil industry, it is necessary to obtain and analyze down-hole conditions, such as pressures and temperatures at various elevations. This has been done most commonly in the past by lowering electrically or mechanically operated gauge devices into the well, these gauges being either suspended on a wire line or fastened to available oil well tubular sections. By utilizing conductor wire lines, the information can be transmitted to the surface on a "real-time" bases. When non-conductor lines are employed, the gauge must be withdrawn to the surface so that the data can be either down-loaded to a plotter or read directly from an internally scribed chart, thus providing the operator with the desired information. In this process, whether the wire line is used as a suspension member or is strapped to the outside of tubular sections forming a string in the bore hole, damaging of the wire line is not uncommon. The damage or destruction of the wire line can occur when the string of tubular sections sticks within the bore hole, or when the wire line and/or tubing string is being run in or out of the hole. Not only is there the cost of the lost equipment, but such damage adds significantly to the cost of the operation because of the time involved in repairing the equipment and in fishing the equipment from the hole. The process of having to fish also includes the risk of endangering the well itself.

Other techniques have been developed for transmitting signals which are produced by apparatus located down-hole to the surface, including devices which develop and transmit signals electromagnetically to the surface. Such signals having been received by a receiving apparatus provide instantaneously information on the conditions sensed down-hole. This telemetry technique involves locating down-hole relatively complex equipment and providing a source of power. Structures have been developed for containing such equipment and power source. These structures enable the use of a portion of the tubing string to function as an antenna in the transmission of the signals to the surface. The process of using the tubing string, such as the upper portion of the string, as the antenna involves the provision of a connection which electrically isolates the upper portion from a lower portion of the tubing string so that the output voltage of the down-hole electromagnetic transmitters can be connected across terminals which are electrically isolated from each other.

The approach of using a telemetry technique for transmitting the information to the surface provides instantaneous readings at a set location of the down-hole sensing equipment and also avoids the use of a wire line. While having significant advantages over other techniques, problems due to the conditions which exist in the bore hole have in many respects hindered successful development in this process. For example, although there exists insulation couplers for use in an arrangement where the upper portion of the tubing is used as an antenna, such couplers have not always functioned satisfactory when the lower portion of the tubular string becomes jammed in the bore hole. This is not uncommon particularly where the lower part of the bore hole deviates from the vertical. Present insulation couplers have not been known to withstand the application of a high torque used in attempting to force the string when jammed, and a severing of the tubing string at the insulation connector results in the lower portion of the tubular string, which houses the expensive telemetry sensing and telemetry equipment, becoming completely disconnected at its down-hole position. Not only is the cost of the equipment involved, but there is the expense involved in reopening the hole and potential damage to the well.

Moreover, due to the nature of the sensing, power source and transmitting equipment utilized in the telemetry process and the extreme conditions to which th down-hole end of the tubing string is subjected, known methods of mounting such equipment has not always proved satisfactory. While the equipment must be protected, the manner in which it is carried and its connection to the insulation connector must be such that it is readily available for exchanging and servicing.

Yet another characteristic of some known structures incorporating an insulation coupler is that they are not capable of coping with particular conditions which can develope either above or below the test equipment when located down-hole. The down-hole test equipment is frequently used in conjunction with annular sealing packers, and in the known structures the insulation connector and/or the test equipment and mounting elements, together with the sealing packers in effect form a complete seal or blockage in the bore hole. Accordingly, in the event a pressure build-up develops either above or below the sealing packers, the tubing string can be sucked into or blown out of the bore hole. This can happen with sufficient force to cause severe injury to personnel and damage to equipment.

DISCLOSURE OF INVENTION

It is an object of the present invention to provide an apparatus for subsurface telemetry signal transmission which overcomes the above described disadvantage of known devices presently available in this technology.

According to one aspect of the present invention, which resides in a connector assembly for connection in a tubing string in a bore hole, the connector assembly electrically insulates an upper section of the string above the connector assembly from a lower section below the connector assembly. The assembly includes an outer housing member and an inner mandrel member.

In one form of the connector assembly the housing member has connection means adjacent one end of the connector assembly for attachment of the one end to one of the above mentioned sections of the string, and the housing member has an internal surface portion defining an opening tapering outwardly in cross-sectional area toward that end of the connector assembly. The mandrel member has connection means adjacent the other end of said connector assembly for attachment of that end of the connector assembly to the other of the above mentioned sections of the tubular sting, and the mandrel member has an exterior surface portion tapering outwardly in cross-sectional area away from that end of said connector assembly. The exterior surface portion of the mandrel member is disposed within the interior surface portion of the housing member and provides a clearance between said surface portions. The connector assembly further includes an electrically non-conducting binder material disposed within the clearance.

It is apparent that in the use of this form an insulation connector of the present invention, the outer housing, which may be connected to the upper portion of the tubular string, for example, can function as an antenna for transmitting signals received from equipment mounted in a carrier section connected to the mandrel member. In the case of a tension force being applied to the connector assembly, shear forces are developed in the binding located in the clearance, but the binding is also in compression between the two tapered surface portions of the housing and mandrel members. Moreover, because of the direction of taper relative to the connection means at the opposite ends of the connection assembly, the mandrel member cannot be pulled through the housing member due to an excessive tensional pull on the tubular string. Even on failure of the binding in the clearance, the tensional pull results only in the surface portions moving towards an engaging position.

In another form of the present invention, the housing member has a first connector means adjacent one end of the connector assembly for attachment to an adjacent tubular section of the string above the connector assembly and the inner mandrel member has a second connection means for attachment to an upper end of an instrument carrier device, the mandrel member being of tubular form defining a central passageway extending from said one end to said other end of said connector assembly. Means is provided for electrically insulating the housing member from the mandrel member. The carrier device includes an elongated tubular member having channels in the exterior surface thereof for accommodating instrument sensing units. The tubular member also has an internal passageway disposed therein and placing a lower end thereof in communicating with said passageway in said mandrel member at the upper end thereof. The tubular member has a third connection means at a lower end thereof for attachment of the carrier device to an adjacent section of the tubing string below said carrier device. An electrically insulating by-pass tube extends through the passageways of said mandrel and said carrier device and has fourth and fifth connector means at upper and lower ends thereof, respectively, for connection of the by-pass tube to the tubular sections above and below the apparatus, thus permitting fluid passage through said apparatus.

In this structure, the by-pass tube extending through the passageways in both the connector assembly and the carrier device provides for fluid communication past the subsurface transmitting apparatus so that pressure build-up connected to the antenna providing member of the connection assembly.

BRIEF DESCRIPTION OF THE DRAWINGS

In the accompanying drawings which show an embodiment of the invention, as example, FIGS. 1A, 1B, 1C, 1D, 1E and 1F, when viewed in end-to-end combination as indicated, show a side cross-section view of the subsurface transmitting apparatus of the present invention.

BEST MODE FOR CARRYING OUT THE INVENTION

Referring now to FIG. 1, wherein like reference numbers denote like elements descried herein, the reference number 10 denotes the overall subsurface transmitting apparatus in which the present invention is incorporated. In FIGS. 1B and 1C, there is shown an insulation coupler 11 and in FIGS. 1C to 1F, as well as FIG. 2, there is shown a carrier device 12 of a preferred embodiment of invention. In use, the apparatus 10 is connected at its upper end to a lower end of tubing string (not shown) which is lowered into the bore hole for taking readings of conditions in the bore hole, such as pressure, temperature, relative angle, etc. The readings are transmitted to a receiver at the surface near the top of the bore for receding and analysis by the operator. The apparatus may also be used to compute other information in relation to the equipment status, i.e. the status of various down-hole components, such as valves, safety joints, etc. The tubular string includes other either above or below the apparatus is prevented, and accordingly the destructive results which can result from such build-up is avoided.

According to another aspect of the invention, there is provided a carrier device for use in a subsurface signal transmitting apparatus, the carrier device being in the form of an elongated body member having a generally cylindrical outer surface. A first connection means is located at one end of said body member for attachment of the body member to an insulation connector assembly having an outer housing member electrically insulated from the body member. The body member has defined in the outer surface thereof a plurality of longitudinal channels commencing adjacent the one end and extending towards an opposite end of said body member. Means are provided for detachably securing instrument sensing units individually within the channels, and a passage extends from said channels to the one end of the body and accommodates a signal transmitting cable extending from the units for electrical attachment to the outer housing of said insulation connector assembly.

The carrier device is capable of being attached to an end of an insulated connector assembly, such as that described above, and more particularly to the connection means provided by the mandrel, so that sensing units which include a transmitting component, can be readily inserted and retrieved from the channels in which they are protected from damage by engagement of the carrier with the sides of the bore hole. The cable which carries the signals to be transmitted can then be located in the provided passage and sections which are connected to the lower end of the apparatus 10, and these may include, for example, sealing packers (not shown).

Figure 1A:
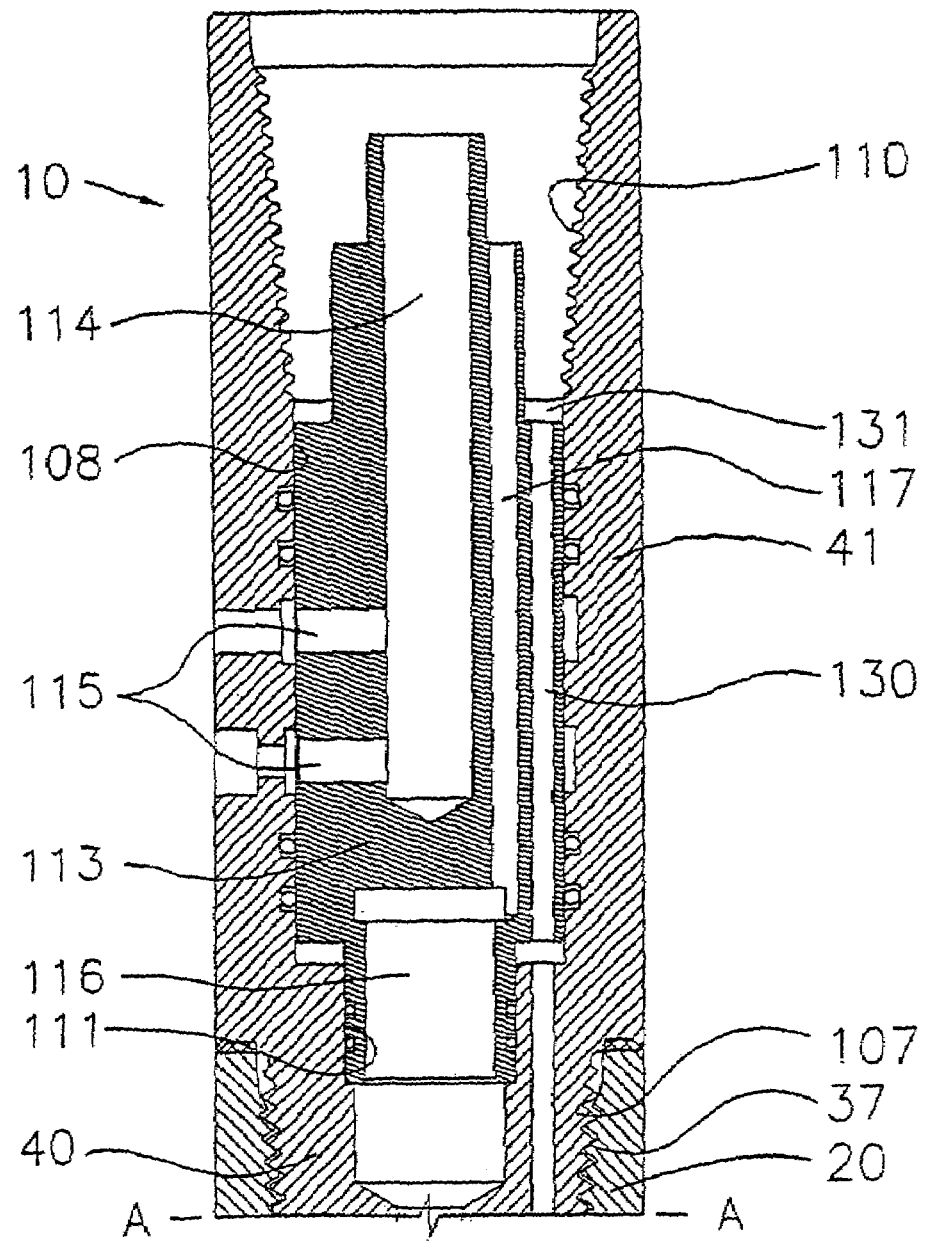
Figure 1B:
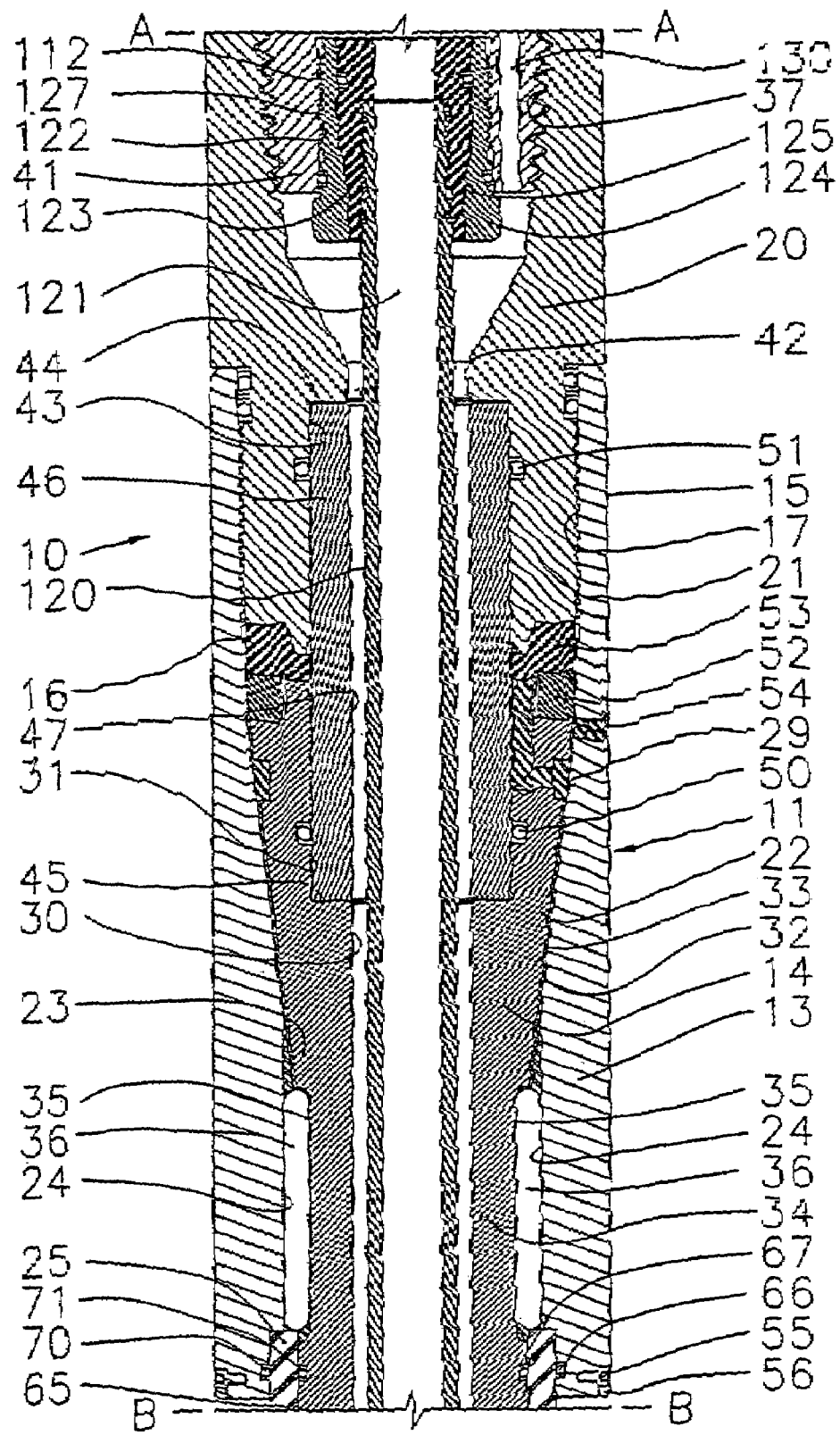

The insulation coupler 11 is in the form of a connector assembly having an outer housing member 13 and inner mandrel member 14, both of which are formed of metal (FIG. 1B). The outer housing member 13 has an outer cylindrical surface 15 which is preferably of the same diameter of the other sections in the tubular string, and it is hollow so as to provide a bore or opening 16 extending therethrough. The opening 16 is of maximum cross-section at its upper end where there is provided a connection means in the form of internal threads 17 for attachment of the outer housing member 13 to a tubular section 20, which has an externally threaded lower end portion 21 of reduced diameter.

Below the internally threaded upper end of the outer housing member 14, the bore or opening 16 is defined by internal surface 22 which tapers outwardly from the lower end towards the connection means provided by the internal threads 17. The surface 22 is preferably in the form of a conic frustum and wherein the gradient or degree of taper is slight so that the outward taper in cross-section of this portion of the opening 16 is relatively gradual. Below the tapered portion of the opening 16 is a lower portion 23 of the opening 16 which is of less diameter, of course, than the cross-section of the internal threaded portion at the upper end. Substantially along the length of the surface defining the lower portion 23 are a plurality of Although the degree of taper of the surfaces 22 and 32 is not great, the cross-section area of the mandrel adjacent the upper end of the taper is significantly greater than the cross-sectional area of the opening 16 in the outer housing member 13 adjacent the lower end of the taper of the opening 16.

Below the tapered surface 32, the mandrel member 14 has a cylindrical portion 34 which has circumferentially spaced, longitudinally extending grooves 35, which are also of substantially semi-circular shape in cross-section. The grooves 24 of the housing member 13 and grooves 32 of the mandrel member 14 align to form a plurality of longitudinal channels or openings, which are substantially circular in cross-section. Each longitudinal opening thus formed has located therein a pin or rod 36 which is also of circular cross-section and of a diameter to fill the longitudinal opening provided by grooves 24 and 35. The rods are formed of an electrically insulating material, such as a tough plastic material which has a significant shear strength.

The tubular section 20 which is connected to the upper end of the outer housing member 12 is a substitute connector in that its upper end has an internally threaded tapered bore 37 (FIGS. 1A and 1B) for receiving an externally threaded lower end portion 40 of a tubular section 41. An internal central bore 42 extends through the tubular section 20, the lower portion of the bore 42 being enlarged at 43 to the same dimension as the enlarged bore 31 circumferentially spaced, longitudinally extending grooves 24 which are substantially semi-circular in cross-section. At the very lowermost end of the outer housing section 13, the internal bore or opening 16 is enlarged to provide annular enlarged bore defining a seat 25 for a sleeve 65.

The inner mandrel member 14 is mainly received within the opening 16 of the outer housing member 13. It has a lower or tail portion 26 (FIG. 1C), which is of smaller diameter than its upper end, and the lower portion 26 has external threads 27 which provide connection means for attachment to the upper end of the carrier device 12. The mandrel ends in an end surface 28. The mandrel member 14 is of tubular form and has an opening or bore 30 extending longitudinally therethrough. The bore 30 is of uniform diameter except for a seal receiving enlargement 31 at its upper end. The upper end portion of the mandrel member 14 has an outer surface 32 which tapers outwardly in a direction away from the connector means provided by the threaded lower portion 26. The size of the tapered portion of the mandrel is selected to substantially fill the tapered portion of the opening 16, and the taper is such to match that of the tapered openings, i.e. the gradient or degree of the outer surface 32 which is also a conic frustum is substantially the same as that of the surface 22. When mounted in an assembled condition within the outer housing member a slight gap or clearance 33 remains between surfaces 22 and 32. The thickness of the clearance 33 is substantially constant and is in the order of 0.040 inch. in the mandrel member 14 (FIG. 1B). The upper end of the enlarged bore in tubular section 20 terminates at a radial shoulder 44, and the lower end of enlarged bore 31 in the mandrel member 14 terminates in a radial shoulder 45. A sleeve 46 of a rigid durable material, which is of a electrically insulating material, is disposed with its opposite ends engaged by the opposed radial shoulders 44 and 45. The diameter of an internal passage 47 in the sleeve 46 is of substantially the same dimension as the bore 30 on the mandrel member 14. O-ring type seals 50 and 51 are disposed in annular grooves formed in the interior surfaces of the enlarged bores 31 and 43 of mandrel member and tubular member 20 to ensure a seal between the sleeve and these members. The upper end of the mandrel member 14 and the lower end of the tubular member 20 are each provided with recessed areas which receive a pair of annular seals 52 and 53, which are, of course, of an electrical insulating nature and provide a seal at the upper end of the mandrel member.

Accordingly, the outer housing 13 and the mandrel member are not in direct contact with each other, and the mandrel member 14 is not in direct contact with the tubular member 20 which is made of metal and is in direct contact with the outer housing 13. Any member which is in contact with both the outer housing member 13 and the mandrel member 14 or in contact with both the mandrel member 14 and the tubular member 20 are formed of electrically insulating material.

The inner tapered surface 22 of the outer housing member 13 and outer tapered surface 32 of the mandrel member 14 are separated a distance equal to the thickness of the clearance 33. This clearance, is filled with a bond material 29 which is of an insulating nature and has considerable strength, such as an epoxy. When the shoulder 45 mandrel is held in abutment with the lower end of the sleeve 46, the mandrel member and the outer housing are positioned correctly relative to each other to provide a controlled clearance 33. The bond material 29, then in a liquid form is injected through an opening 54 in the housing member 13, and the material completely fills the clearance and passes down into the spaces adjacent the rods 36. At the upper end, the liquid epoxy is retained by seals 50 and 51. The material 29 then sets to provide a rigid bond connection between the tapered surfaces 22 and 32 capable of transferring normally experienced torque forces between the outer housing member 13 and the mandrel member 14. The bond connection between the tapered surfaces 22 and 33 is also capable of transferring forces through the insulation coupler in the longitudinal direction, such as the weight of the portion of the tubular string below the apparatus which places the bonding material in shear and also in compression as the mandrel member 14 is pulled down relative to the housing member 13.

In the event of extremely high torsional forces such as in the event of the lower part of the tubular rod becoming jammed, or should the bond material 29 start to fail, torsional forces are transferable from the outer housing member 13 to the mandrel member 14 by way of the rods 36 contained in the groove 24 of the housing member and the grooves 35 of the mandrel member. Of importance in the insulation connection is the direction of the slopes of the surfaces 22 and 32 in relation to the connection means provided by the threaded ends of the housing member 13 and the mandrel member 14. In an upward pull of the tubular string from the bore, such as when a lower portion of the string below the insulation coupler 11 becomes jammed, and this pulling force may occur in combination with a torsional exertion, the bonding material in the clearance, while experiencing shear forces is also in a state of compression between the surfaces 22 and 32. Furthermore, in event of failure of the bonding material, the mandrel member cannot disconnect from the housing member as in the longitudinal directions, the surfaces can simply move toward an engaging position. Accordingly, the costly situation which occurs when the lower portion of the tubular string becomes separated and lodged in a down-hole location is avoided.

It is apparent that the insulation coupler 11 could be constructed in a manner to be inserted in a tubular string in an inverted orientation and still utilize the basic principle shown in the illustrated embodiment. With obvious modifications, the housing member could be adapted to be connected to the carrier device with the mandrel member, which is electrically isolated from the housing member, being connected to the tubular member above the coupler. The relationship between the tapered surfaces of the two members would still be such that the members could not be separated by an extreme longitudinal pull on the coupler.

At the lower end of the outer housing member 13, there is provided a plurality of screws one of which is shown at 55 threaded into a hole in the outer surface of the housing member (FIG. 1B). A short groove 56 extends from each screw to the lower end of the housing member 13. This provides a terminal connection for an output cable 57 (FIG. 2) extending from the signal transmitter equipment carried by the carrier device 12. Because the outer housing member 13 is insulated from the carrier device and the tubular members carried therebelow, the outer housing and the sections in the tubular string thereabove function as an antenna for the transmitted signals.

Figure 1C:
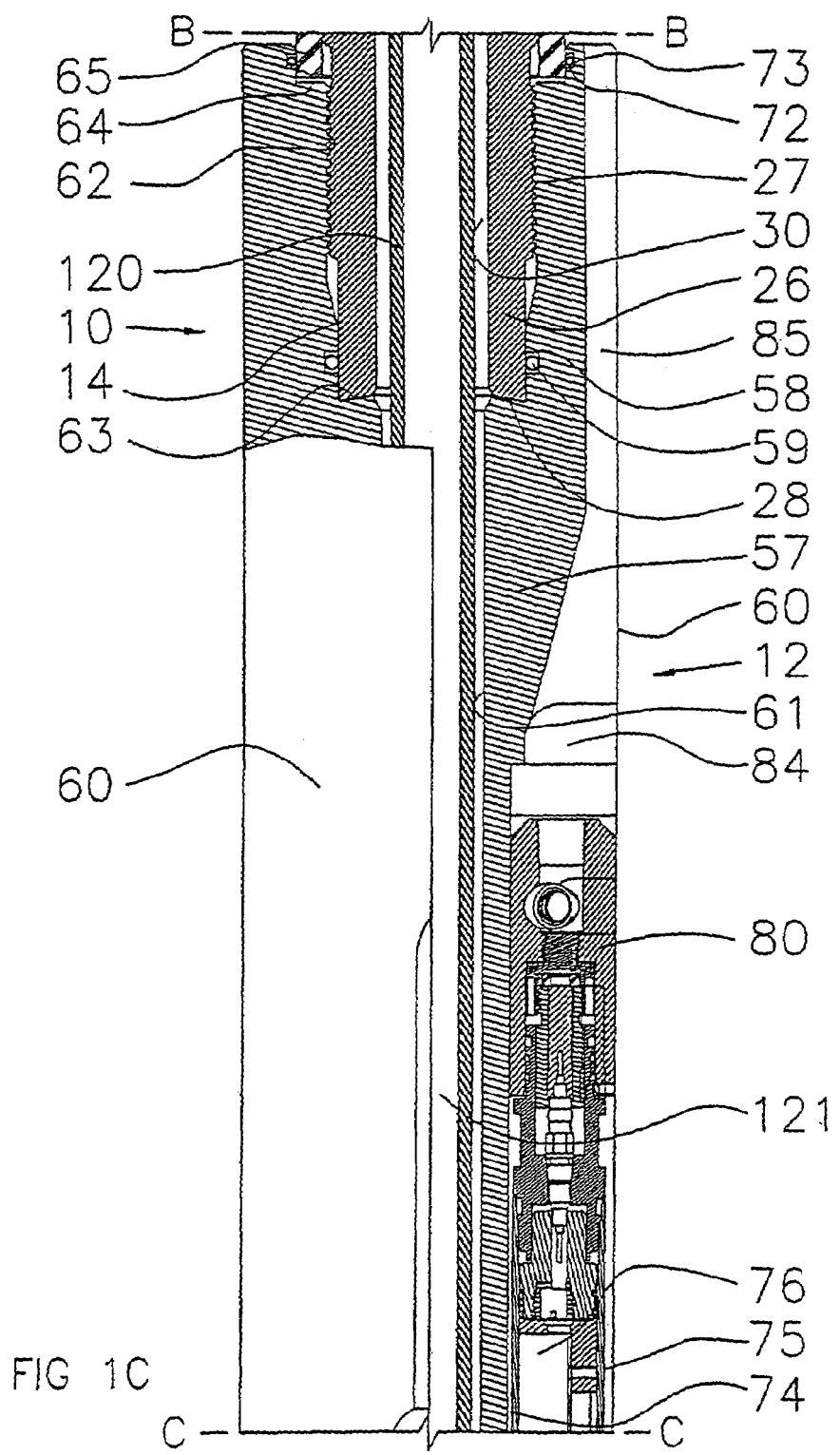
Figure 1D:
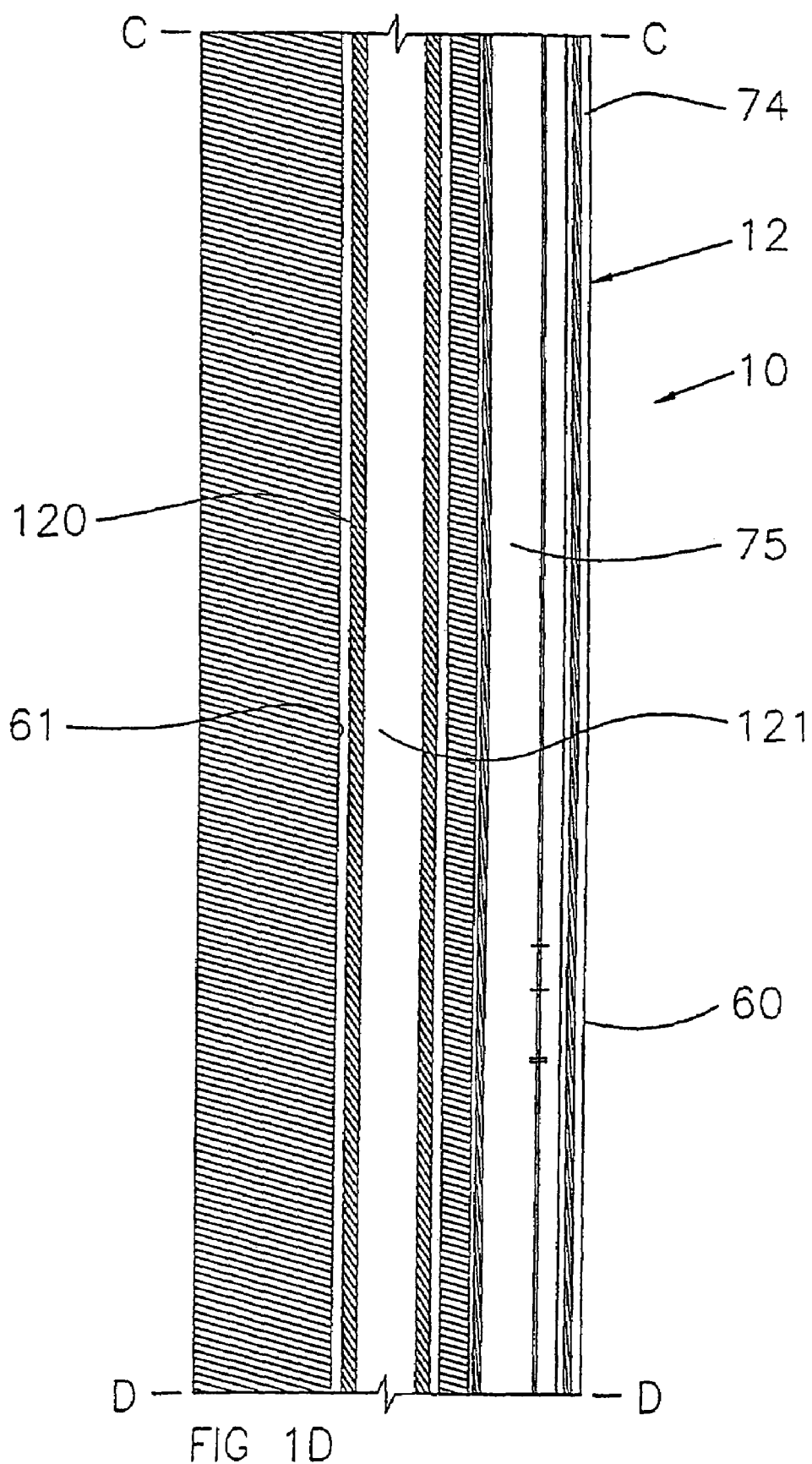
Figure 1E:
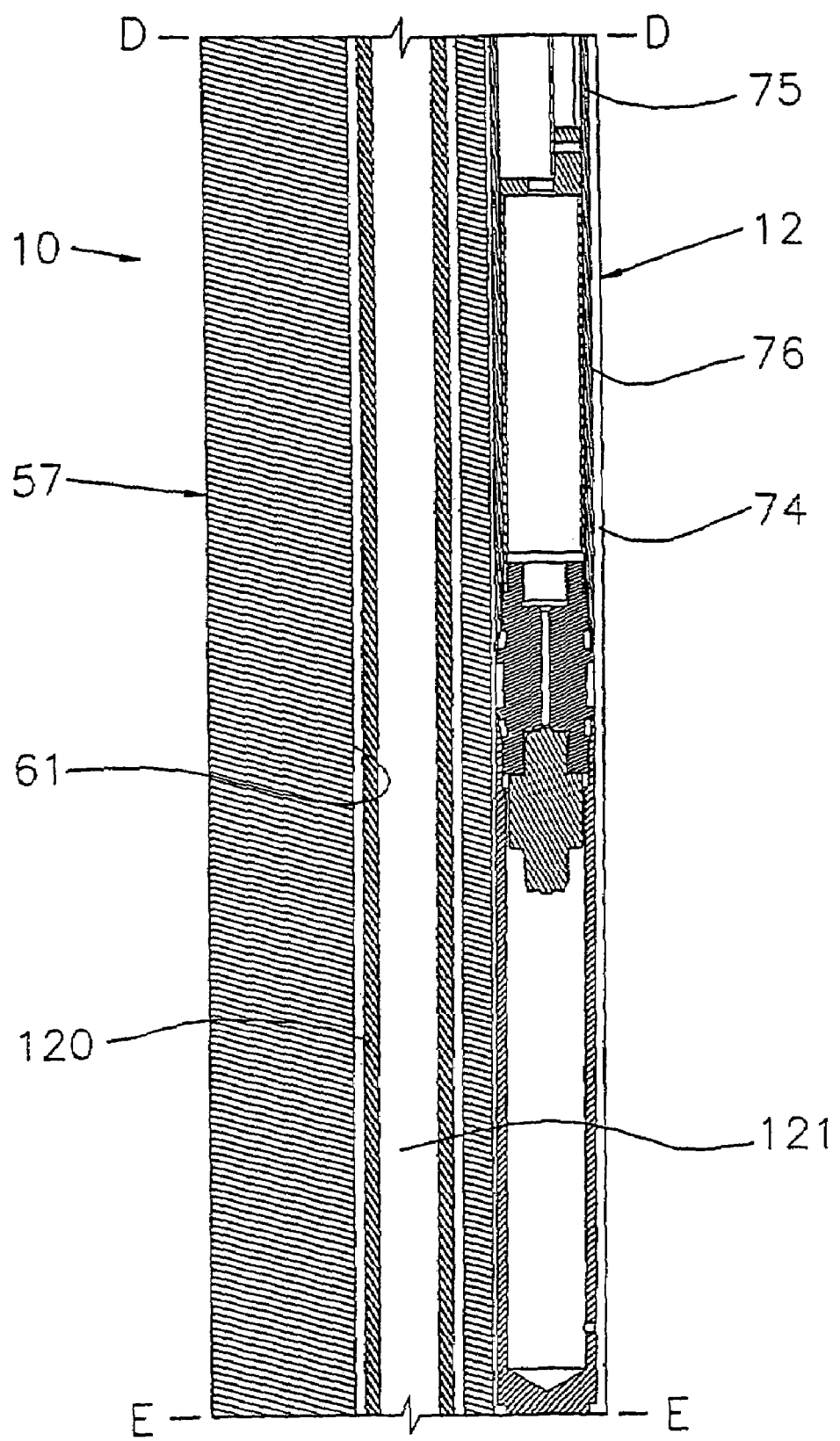

As previously described, the lower portion 26 of the mandrel member 14 is attached to an upper end of the carrier device 12 which includes an elongated, generally cylindrical body 57 (FIG. 1C). The body 57 has an outer surface 60 which is preferably of the same outer diameter as the other tubular members of the string, and it is of tubular form having a longitudinal bore 61 is generally of the same diameter as the bore 30 of the mandrel member 14. The upper end of the bore is enlarged and is provided with internal threads 62 for threaded reception of externally threaded lower portion 26 of the mandrel member 14. The lower end of the enlarged portion of the bore at the upper end of the body 57 provides a shoulder 63 against which the end surface 28 of the mandrel member 13 engages so as to provide a sealed joint. There is further provided an annular groove 58 in the enlarged bore between the threads 62 and the shoulder 63, which groove receives a seal 59.

At the very upper end of the body member 57 there is an enlarged bore 64 which is of the same diameter as bore 25 in the lower end of the housing member 13. While the lowermost end surface of the housing member 13 and the uppermost end surface of the carrier device 12 are spaced, a sleeve 65, which is formed of an electrically insulating material, spans the space and has opposite ends thereof received in the enlarged bores 25 and 64. Within the seat 25 of the housing member 13, there is an annular groove 66 (FIG. 1B). Opposite the groove 66, there is provided an annular groove 67 on the exterior surface of the mandrel member 14. The grooves 66 and 67 contain seals 70 and 71 which engage the exterior and interior surfaces, respectively, of the end of the sleeve 65 extending into the seat 25 of the housing member 13. These seals retain the epoxy at the lower end of the insulating coupler 11, when the bonding material is inserted into the clearance 33. The enlarged bore 64 in the upper end of the body 57 is also provided with an annular groove 72 which receives a seal 73 so as to provide a sealed connection between the insulating sleeve 65 and the body 57 (FIG. 1C).

Figure 1F:
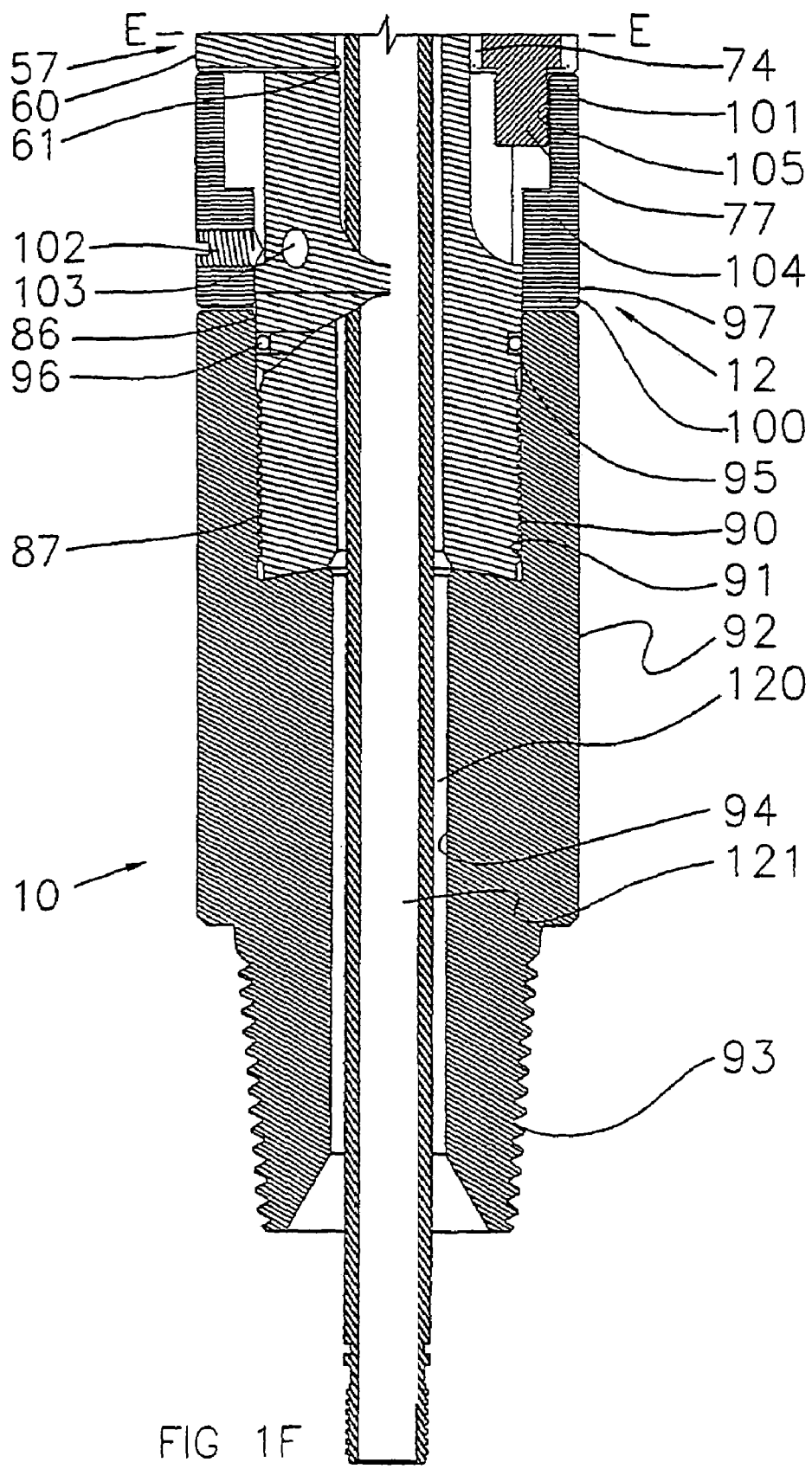
Figure 2:
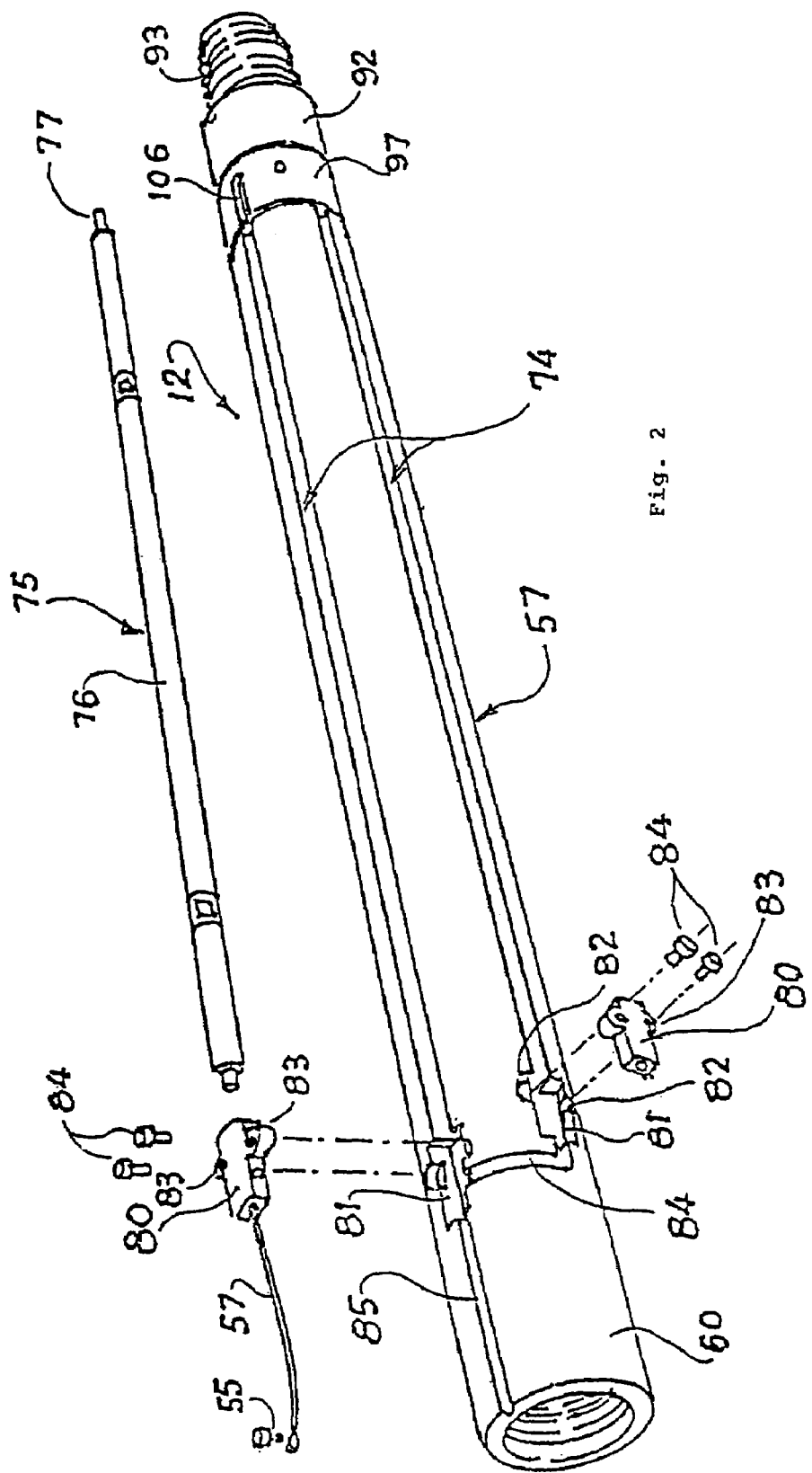
FIG. 2 is a perspective, exploded view of the carrier device forming part of the apparatus of FIG. 1.

Defined in the outer surface 60 of the body 57 are a plurality of longitudinally extending grooves or channels 74 which commence a short distance below the upper end of the body 57 and extend substantially to the lower end thereof. The channels 74, which may number four, are circumferentially spaced about the body 57 and are shaped in cross-section to closely receive a sensing instrument or battery pack 75 either of which are designed in the form of an elongated member 76 having an outer or lower end 77 of reduced cross-section (FIGS. 1F and 2). The upper end of the instrument or battery pack has a threaded male portion which screws into a terminal block 80 (FIG. 1C). Each channel 74 has a widened portion 81 at its upper end for receiving the terminal block 80 which is wider than the instrument or battery pack 75. The widened portion 81 further has opposed recesses for receiving opposed ears 83 of the terminal block 80 (FIG. 2). The ears 83 are provided with holes to receive screws 84 which are threaded into threaded openings in the bottom of recesses so as to secure the terminal block and the upper end of the instrument or battery pack which is fastened thereto within the channel 74.

Passages or channels 84 interconnect the widened portions 81 of the channels 74, the channel 84 may receive cables for electrically interconnection of the terminal blocks. A channel 85 extends longitudinally from at least one of the widened portions 81 of the channel 74 to the upper end of the body 57. The channel 85 can be aligned with the short channel 56 at the bottom of the insulated housing member 13 so that the cable 57 can be accommodated for connection to screw 55 threaded into the housing member 13. The housing member 13 and the tubular section 20 and other sections thereabove, which are not insulated from the housing member, as previously described, may function as an antenna for transmitted information from the instrumentation mounted in the carrier device 12.

As can be seen in FIG. 1F, there is provided at the lowermost end of the cylindrical body 57, a portion 86 of reduced diameter, and near the lower end of the portion 86 there are provided external threads 87. A tubular member 92 in the form of a substitute connector is threaded onto the outer end of the portion 86 by way of internal threads 90 in an enlarged bore 91 at the upper end of the tubular member 92. A lower end portion 93 of the tubular member 27 of reduced diameter is externally threaded for reception in an internal threaded portion of adjacent member of the tubular string below the apparatus 10. A bore 94, which is substantially the same diameter as the interior bore 61, extends longitudinally through the tubular member 92. Within the enlarged bore 91 above the internal threads 90 is an annular groove 95 which contains a seal 96.

The portion 86 which is of reduced diameter at the lower end of body 57 extends over the lower ends of the channels 74. A collar or ring member 97 which has an internal diameter only slightly larger than the outer diameter of the portion 86 is positioned between an upper end surface 100 and a shoulder 101 provided at the top of the portion 86. The ring member 97 is free to turn on the reduced portion 86 but there is provided a set screw 102 threaded through the ring and positioned to enter a radial bore 103 in the body 57 so as to lock the ring against rotation in a set position when the set screw 102 is turned in. The upper end portion of the ring member has an enlarged internal diameter to provide a skirt portion 104 having an internal surface 105. The internal diameter of the internal surface 105 is sufficient that it engages and encompasses the reduced lower ends 77 of the instrument or battery packs 75, thus normally holding the lower parts of such packs snugly within their respective channels 74. The skirt portion 104 of the ring member 97 has a slot 106 (FIG. 2) extending into the skirt from an upper edge of the skirt portion, the slot 106 having a width permitting movement of the reduced end portion 77 out through the slot in a direction which is radial relative to the body 57. Accordingly, when the set screw 102 is turned out and the ring member 97 is rotated to locate the slot 106 over a particular channel 74, the lower end of the battery pack or instrument pack located in that channel can be removed. By turning the elongated member 76 of the battery or instrument pack from its respective terminal block 80 at the upper end, the elongated member can be separated from the carrier device, or alternatively by removing the screws 84, the entire unit including the terminal block 80 can be removed.

It can be seen that the carrier device 12 provides a relatively simple and yet rugged structure for mounting in a protected manner the sensing means, the power source and the related instrumentation for obtaining and transmitting down-hole information, but which allows ready access of the equipment for replacement and servicing.

The lower end portion 40 of the tubular member or section 41 (FIG. 1A) is of reduced diameter and is provided with external threads 107 for connection with threads 37 of tubular member 20. The tubular member 41 has an enlarged central bore 108 which extends downwardly a substantial distance from the upper end thereof. The upper portion of the enlarged bore 108 is threaded at 110 for connection to the adjacent tubular section above the apparatus 10. At the bottom of the enlarged central bore 108 there is a bore 111 of smaller diameter which communicates with a bore 112 of larger diameter extending upwardly from the bottom end of lower end portion 41. (FIG. 1B). Received in the enlarged bore 108 is a by-pass core member 113 which has a blind central bore 114 positioned to communicate with a central bore of the next adjacent tubular member connected by way of threads 110. The central blind bore 114 communicates with the space exterior of the tubular string in the bore hole by way of radial ports 115. Extending upwardly from the bottom of the core is a blind bore 116 which is in communication with the bore 112 extending to the bottom of the tubular section 41. A supplementary, longitudinal passage 117 communicates with the blind bore 116 and the space adjacent the upper end of blind port 114 whereby fluid pressure within the bore 116 can be evacuated into the well borehole outside of the tubular string.

Extending from the bottom of the tubular member 41 to below the tubular member 92 is a by-pass tube 120, which is connected by insulating means to the tubular member 41, and is formed of a material, such as a high strength non conductive plastic. The by-pass tube 120 provides a fluid passageway 121 past the apparatus 10. As shown in FIG. 1B the upper end of the tube 120 is externally threaded at 122 and is screwed into an insulating collar 123 which may be formed, for example, of Teflon. The lower exterior surface of collar 123 is tapered inwardly. A retainer 124 which has a matching tapered interior bore 125 and exterior threads 126 is turned into interior threads 127 within bore 112 at the bottom of tubular member 41. The collar 123 is received in the retainer and thus fastens the upper end of the tube 120 to the bottom of tubular member 41 and places the passageway 121 in communication within the passage 117. A tubular member of the same structure as 41, which provides a by-pass coupler at the upper end of apparatus 10 may be connected by way of threads 93 of tubular member 92 at the lower end of the apparatus 10 for completing the by-pass connection at that end.

The core member 113 within the central bore 180 of the tubular member 41 is also provided with a passageway 130. This passageway communicates at its upper end with the annular space 131 below the end of the tubular member next above tubular member 41, the space 131 being in communication with a fluid source which is controlled for transmitted fluid to controlled components, such as expandible sealing packers. The passageway 130 communicates with the space within the interior bore 42 of the tubular member 20 and outside of the exterior surface of the by-pass tube 120. This space continues to the lower end of the apparatus on the outside of the by-pass tube 120, as the interior bores of all of the other components through the apparatus are larger than the outside diameter of the by-pass tube 120. At the bottom of the apparatus communication is made between this space and a passageway (not shown) for separately conducting the fluid to its required location, such as the packer seal.

The by-pass tube 120 is utilized to place the space within the borehole below the apparatus in communication with the borehole above the apparatus. This is done via the central bore of the tubular members deeper in the hole which are in communication with the exterior of the tubular string through the passageway 121 of the by-pass tube 120 to the tubular member in the string above the apparatus. Accordingly, the build up of a pressure differential, which can force the tubular string upwardly or downwardly, is avoided.

While an embodiment of the invention has been illustrated, modifications within the spirit of the invention as defined in the appending claims, will be apparent to those skilled in the art.

The invention claimed is:

1. An insulator for a subsurface signal transmitting apparatus, comprising:
   a housing having an inner surface which is gradually tapered;
   a mandrel axially disposed inside the housing and having an outer surface which is gradually tapered and which corresponds to the tapered surface of the housing;
   a first insulating material disposed between the housing and the mandrel;
   a first sleeve formed of a second insulating material disposed between the housing and a first tubular member; and
   the first tubular member coupled to the mandrel.

2. The insulator of claim 1, wherein the mandrel is bonded to the housing with the first insulating material.

3. The insulator of claim 2, further comprising an anti-rotation member configured to ensure the housing and the mandrel remain rotationally coupled in the event of failure of the first insulating material.

4. The insulator of claim 3, wherein the anti-rotation member comprises at least one rod disposed between the housing and the mandrel and the rod is formed of a third insulating material.

5. The insulator of claim 1, wherein the first insulating material is epoxy.

6. The insulator of claim 1, further comprising an internal seal between the housing and the mandrel.

7. The insulator of claim 1, further comprising:
   a second tubular member coupled to the housing; and
   a second sleeve formed of a third insulating material disposed between the mandrel and the second tubular member.

8. An insulator for a subsurface signal transmitting apparatus, comprising:
- a housing having an inner surface which is gradually tapered;
- a mandrel, having an outer surface which is gradually tapered and which corresponds to the tapered surface of the housing;
- a first insulating material bonding the mandrel to the housing, wherein the housing and the mandrel are configured to remain coupled in the event of failure of the first insulating material; and
- at least one rod disposed between the housing and the mandrel, wherein the rod is formed of a second insulating material and configured to ensure the housing and the mandrel remain rotationally coupled in the event of failure of the first insulating material.

* * * * *